(12) United States Patent
Kawada et al.

(10) Patent No.: US 12,311,466 B2
(45) Date of Patent: May 27, 2025

(54) WELDING METHOD AND WELDED MEMBER

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Yasutaka Kawada, Kawasaki (JP); Kouhei Yamada, Komae (JP); Yoshinobu Makino, Machida (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 168 days.

(21) Appl. No.: 17/646,347

(22) Filed: Dec. 29, 2021

(65) Prior Publication Data

US 2022/0212285 A1 Jul. 7, 2022

(30) Foreign Application Priority Data

Jan. 4, 2021 (JP) ................................. 2021-000213

(51) Int. Cl.
*B23K 26/342* (2014.01)
*B23K 26/32* (2014.01)

(52) U.S. Cl.
CPC ............ *B23K 26/342* (2015.10); *B23K 26/32* (2013.01)

(58) Field of Classification Search
None
See application file for complete search history.

(56) References Cited

U.S. PATENT DOCUMENTS

| 9,095,928 | B2 | 8/2015 | Ash et al. |
| 9,676,060 | B2 | 6/2017 | Muramatsu et al. |
| 10,821,550 | B2 | 11/2020 | Miyagi |
| 2006/0011592 | A1 | 1/2006 | Wang et al. |

(Continued)

FOREIGN PATENT DOCUMENTS

| CN | 104411439 A | 3/2015 | |
| DE | 102016204577 A1 * | 9/2017 | ........... B23K 26/032 |

(Continued)

OTHER PUBLICATIONS

Machine translation of WO 2014046245 A1 performed on Jul. 6, 2023, Fujiya et al. (Year: 2014).*

(Continued)

*Primary Examiner* — Dana Ross
*Assistant Examiner* — Kevin Guanhua Wen
(74) *Attorney, Agent, or Firm* — Oblon, McClelland, Maier & Neustadt, L.L.P.

(57) ABSTRACT

A welding method for subjecting a surface to be built-up of an elongated workpiece to a build-up welding process along a longitudinal direction of the workpiece, the welding method includes a step of forming a build-up layer on the surface to be built-up by supplying a filler metal to the surface to be built-up along the longitudinal direction and by applying a laser beam thereto to melt the filler metal. In the step of forming the build-up layer, information on a dimension of a molten pool formed by the filler metal and the workpiece molten by the laser beam is obtained, and an output of the laser beam is controlled based on the information.

8 Claims, 4 Drawing Sheets

(56) References Cited

U.S. PATENT DOCUMENTS

| | | | |
|---|---|---|---|
| 2013/0153543 A1 | 6/2013 | Tsubota et al. | |
| 2016/0314860 A1* | 10/2016 | Kamo et al. | G21C 19/20 |
| 2017/0095885 A1 | 4/2017 | Zhang et al. | |
| 2018/0185963 A1* | 7/2018 | Ostroverkhov et al. | ................. B23K 26/123 |
| 2019/0255654 A1* | 8/2019 | Beckett et al. | B23K 26/34 |
| 2020/0166909 A1* | 5/2020 | Noone et al. | G05B 19/4155 |

FOREIGN PATENT DOCUMENTS

| | | | | |
|---|---|---|---|---|
| FR | 3004369 A1 * | 10/2014 | | B23K 1/0008 |
| JP | 6-174126 A | 6/1994 | | |
| JP | 3979281 B2 | 9/2007 | | |
| JP | 2007-532314 A | 11/2007 | | |
| JP | 2010-188350 A | 9/2010 | | |
| JP | 2015-188938 A | 11/2015 | | |
| JP | 5907718 B2 | 4/2016 | | |
| JP | 2020-124722 A | 8/2020 | | |
| JP | 2020-131208 A | 8/2020 | | |
| JP | 2020131208 A1 * | 8/2020 | | B23K 26/342 |
| KR | 10-2013-0124391 A | 11/2013 | | |
| RU | 2674588 C2 * | 12/2018 | | B23K 37/02 |
| WO | WO 2014046245 A1 * | 3/2014 | | F01D 5/288 |
| WO | WO 2016/181695 A1 | 11/2016 | | |
| WO | WO 2017163430 A1 * | 9/2017 | | B22F 10/30 |
| WO | WO 2019040948 A1 * | 2/2019 | | B33Y 50/02 |

OTHER PUBLICATIONS

Machine translation of WO 2017163430 A1 performed on Dec. 13, 2023, Noriyama et al. (Year: 2017).*

Machine translation of DE 102016204577 A1 performed on Mar. 27, 2024, Heese et al. (Year: 2017).*

Machine translation of JP 2020131208 A1 performed on Mar. 27, 2024, Ogawa et al. (Year: 2020).*

Machine translation of FR 3004369 A1 performed on Oct. 1, 2024, Pereira et al. (Year: 2014).*

Machine translation of JP 2020131208 A1 performed on Oct. 1, 2024, Ogawa et al. (Year: 2020).*

Machine translation of RU 2674588 C2 performed on Oct. 1, 2024, Bitter et al. (Year: 2018).*

* cited by examiner

WELDING METHOD AND WELDED MEMBER

CROSS-REFERENCE TO RELATED APPLICATIONS

This application is based upon and claims the benefit of priority from Japanese Patent Application No. 2021-000213, filed Jan. 4, 2021; the entire contents of which are incorporated herein by reference.

FIELD

An embodiment described herein relates to a welding method and a welded member.

BACKGROUND

Reduction of the emission of greenhouse gases, which is typified by carbon dioxide, is required for environmental protection. In order to reduce carbon dioxide emissions, a thermal power plant, which uses a large amount of fossil fuel is desired to improve power generation efficiency.

In order to improve the power generation efficiency of a thermal power plant, it is effective to increase a temperature of steam flowing through the thermal power plant. Thus, components used in a thermal power plant need to have superior high-temperature resistance and improved wear resistance more than ever before.

For example, a steam valve which controls the flow rate of steam flowing into a steam turbine opens and closes while being exposed to a high temperature and high pressure steam. A valve stem which is a part of the steam valve is required to be escaped from wear caused by sliding and from generation of an oxidized scale. This is due to the following reasons. Namely, when the valve stem is worn by sliding, an amount of steam leaking from a gap between the valve stem and a valve chest increases, which lowers the thermal efficiency of the thermal power plant. In addition, the valve stem reacts with high temperature steam to form an oxidized scale on its surface. The formation of the oxidized scale increases an external diameter of the valve stem. Then, the oxidized scale peels off and accumulates around the valve stem. When the external diameter of the valve stem increases and/or when the oxidized scale accumulates between the valve stem and the valve chest, the valve stem cannot move as desired.

In terms of this point, JPH6-174126 discloses a method of forming a build-up layer by welding a cobalt-base alloy to a surface of a valve stem base material to form a hardened layer (build-up layer) in order to improve wear resistance of the valve stem and to prevent generation of an oxidized scale.

However, it was found that a portion of the valve stem manufactured by the method described in JPH6-174126 did not have sufficient wear resistance to withstand use in a thermal power plant where high temperature steam flows. More specifically, it was found that the hardness of the build-up layer formed on the valve stem was sufficient in the vicinity of a weld start portion, but was insufficient from the vicinity of a weld middle portion to the vicinity of a weld end portion.

DETAILED DESCRIPTION

A welding method in an embodiment is a welding method for subjecting a surface to be built-up of an elongated workpiece to a build-up welding process along a longitudinal direction of the workpiece, the welding method comprising:
  a step of forming a build-up layer on the surface to be built-up by supplying a filler metal to the surface to be built-up along the longitudinal direction and by applying a laser beam thereto to melt the filler metal;
  wherein, in the step of forming the build-up layer, information on a dimension of a molten pool formed by the filler metal and the workpiece molten by the laser beam is obtained, and an output of the laser beam is controlled based on the information.

A welded member in an embodiment is a welded member with a build-up layer on a surface to be built-up of an elongated workpiece, the build-up layer being formed by welding a filler metal to the surface to be built-up, wherein
  a dilution rate of components of the filler metal in the build-up layer is 10% or more and 40% or less.

Alternatively, a welded member in an embodiment is a welded member with a build-up layer on a surface to be built-up of an elongated workpiece, the build-up layer being formed by welding cobalt-base alloy to the surface to be built-up, wherein
  a Vickers hardness of the build-up layer is Hv 320 or more and Hv 500 or less.

Figure 1:
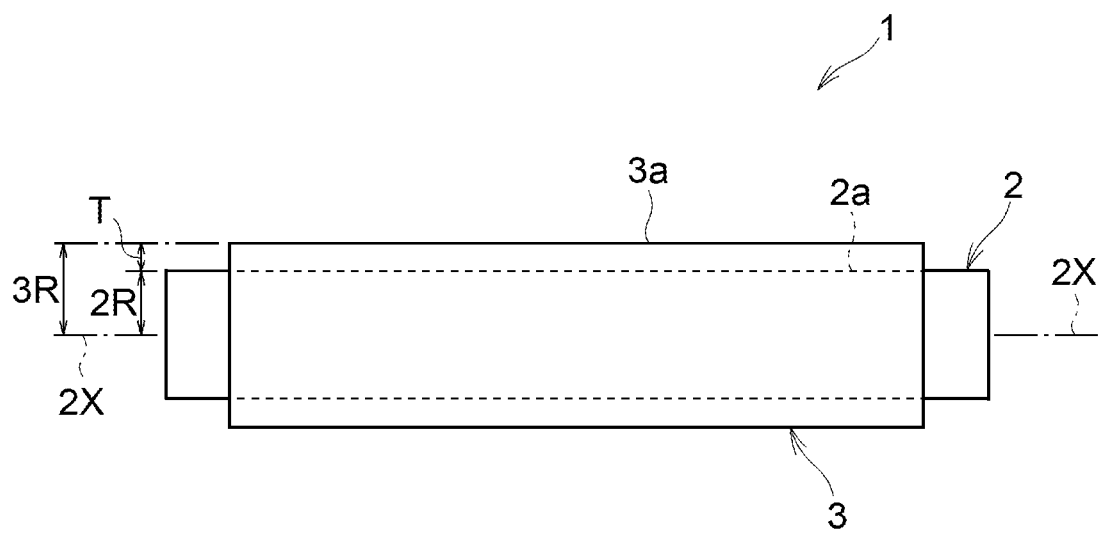
FIG. 1 is a side view showing a welded member according to an embodiment of the present invention, wherein a build-up layer is formed on a workpiece.
Figure 2:
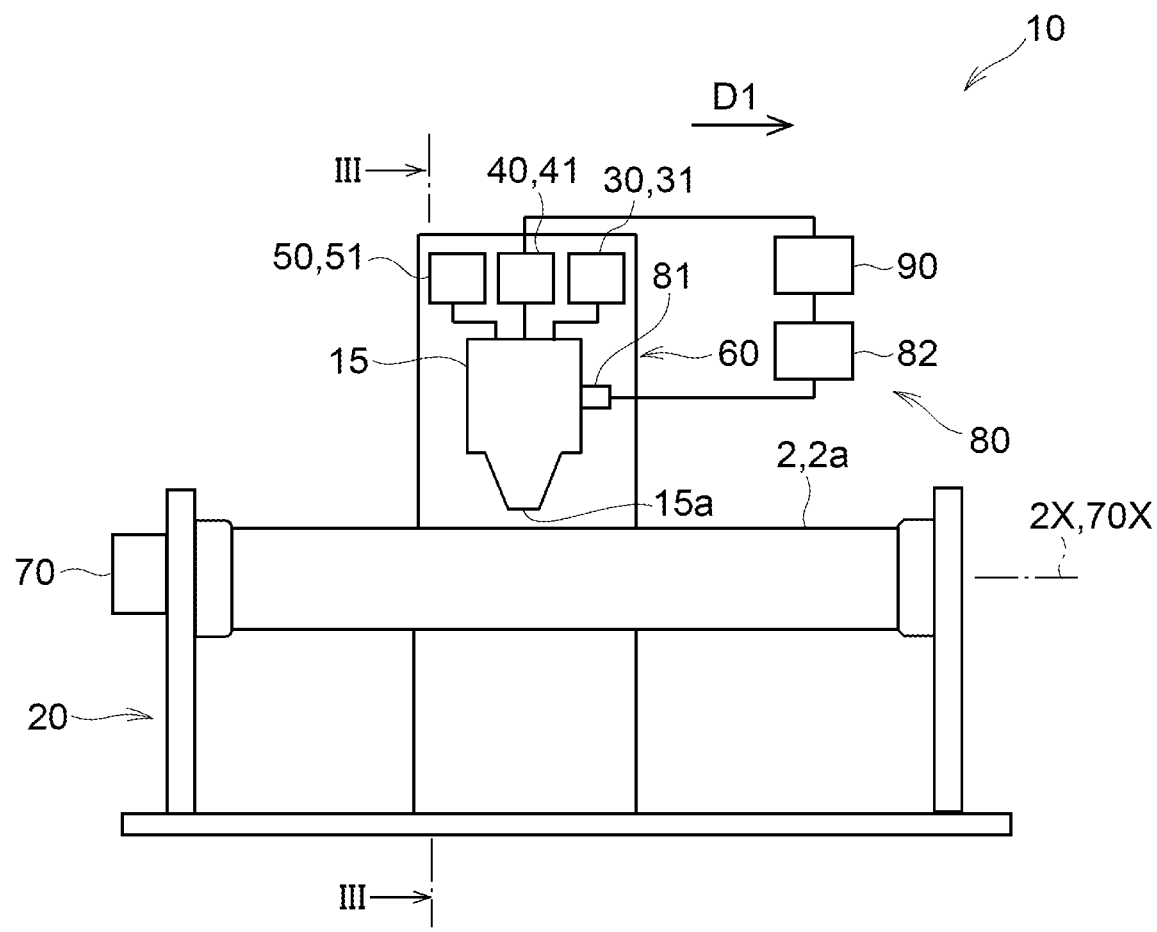
FIG. 2 is a side view showing a welding equipment for forming the build-up layer shown in FIG. 1.
Figure 3:
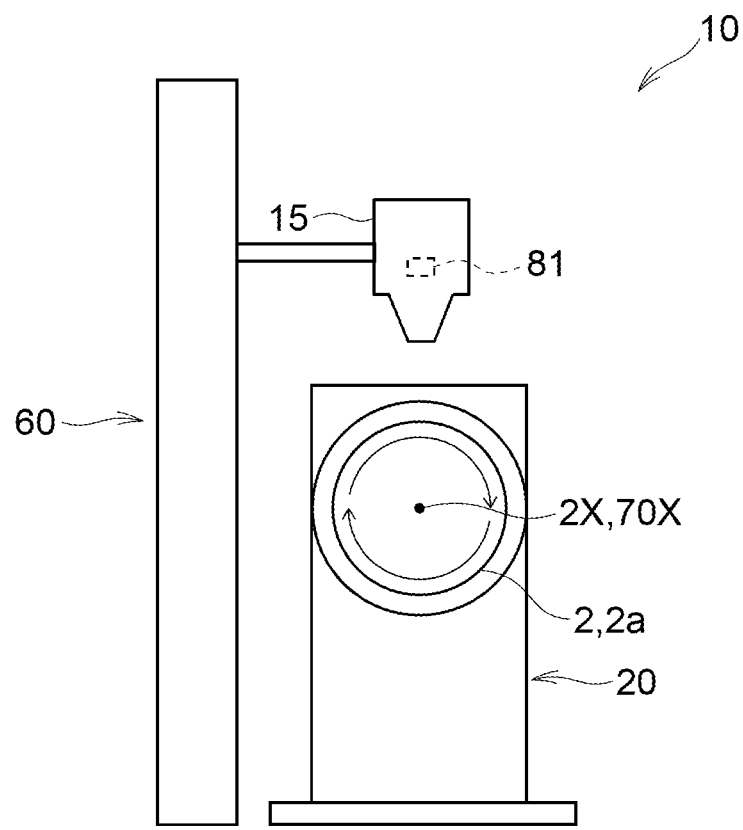
FIG. 3 is a view showing a cross-section of the welding equipment shown in FIG. 2 along the III-III line in the figure.
Figure 4:
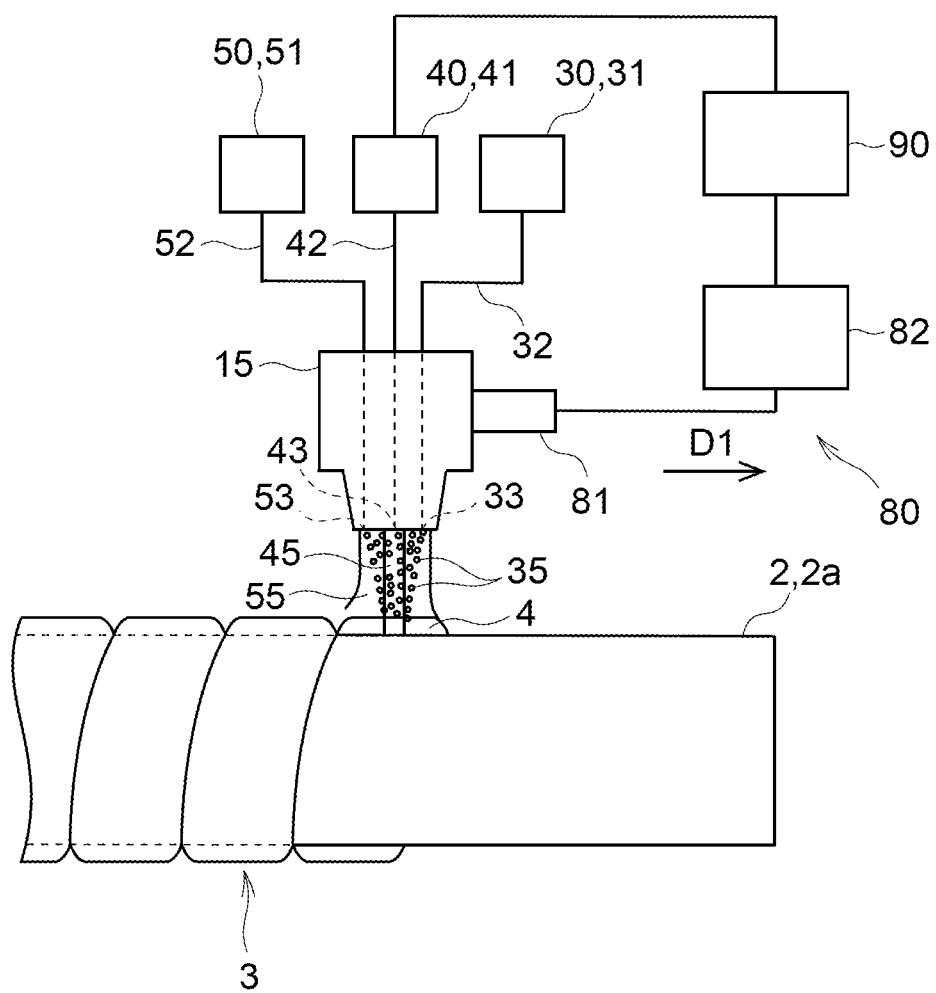
FIG. 4 is a partially enlarged view showing the welding torch and the temperature sensor shown in FIG. 2.

An embodiment is described with reference to the drawings. FIG. 1 is a view showing a welded member according to an embodiment. FIGS. 2 and 3 are views schematically showing a structure of a welding equipment for manufacturing the welded member shown in FIG. 1. FIG. 3 is a view showing a cross-section of the welding equipment shown in FIG. 2 along the III-III line in the figure. In FIG. 3, illustration of a filler-metal supply unit 30, a laser irradiator 40 and a shielding-gas supply unit 50 described below is partially omitted for the sake of simplicity of illustration. FIG. 4 is a view partially showing the welding equipment shown in FIGS. 2 and 3 in enlargement.

A welded member 1 shown in FIG. 1 is manufactured by a build-up welding process for forming a build-up layer 3 on a surface to be built-up 2a of a workpiece 2. A welding equipment 10 shown in FIGS. 2 and 3 subjects the surface to be built-up 2a of the workpiece 2 to the build-up welding process. More specifically, the welding equipment 10 forms the build-up layer 3 on the surface to be built-up 2a of the workpiece 2 with a filler metal 35 that is molten by means of a laser beam 45.

As shown in FIG. 1, the workpiece 2 has an elongated shape with a longitudinal direction. In the illustrated example, the workpiece 2 is formed in a solid cylindrical shape, and has a cylindrical surface (surface to be built-up 2a). In the illustrated example, the workpiece 2 is a forged bar of nickel (Ni)-base alloy. It goes without saying that the shape of the workpiece 2 and the material forming the workpiece 2 are not limited thereto. For example, the workpiece 2 may be formed in a hollow cylindrical shape.

In addition, the material forming the workpiece 2 may be an iron (Fe)-base alloy. In this specification, the nickel-base alloy refers to a material having the highest fractions by weight of nickel elements, and the iron-base alloy refers to a material having the highest fractions by weight of iron elements.

As shown in FIG. 2, the welding equipment 10 has a supporter 20 that supports the workpiece 2, a filler-metal supply unit 30 that supplies the filler metal 35 to the workpiece 2, a laser irradiator 40 that applies the laser beam 45 to the workpiece 2, a shielding gas supply unit 50, a longitudinal motion drive 60 that relatively moves the laser irradiator 40 with respect to the supporter 20, and a rotational motion unit 70 that rotates the workpiece 2 supported by the supporter 20.

The supporter 20 supports both the ends of the elongated workpiece 2. The supporter 20 supports both the longitudinal ends of the workpiece 2 such that the workpiece 2 is rotatable around a rotation axis 70X along the longitudinal direction.

As shown in FIG. 4, the filler-metal supply unit 30 has a filler-metal housing 31 that houses powder of the filler metal 35, a filler-metal supply tube 32 that leads the powder of the filler metal 35 derived from the filler-metal housing 31 to the vicinity of the workpiece 2 supported by the supporter 20, and a filler-metal ejection hole 33 provided at the distal end of the filler-metal supply tube 32 to eject the filler metal 35. The filler metal 35 may be a cobalt (Co)-base alloy, a nickel-base alloy and an iron-base alloy, for example. The filler-metal supply unit 30 may further have a carrier-gas supply unit (not shown) that supplies a carrier gas to the filler-metal supply tube 32. In this case, when the filler metal 35 is ejected from the filler-metal ejection hole 33, the filler metal 35 accompanied by a carrier gas can be supplied to the workpiece 2.

As shown in FIG. 4, the laser irradiator 40 applies the laser beam 45 to the workpiece 2 supported by the supporter 20. The laser irradiator 40 has a laser oscillator 41, an optical fiber 42 that guides the laser beam 45 oscillated by the laser oscillator 41 to the vicinity of the workpiece 2 supported by the supporter 20, and a laser emitter 43 provided at the distal end of the optical fiber 42 to emit the laser beam 45 guided by the optical fiber 42 toward the workpiece 2 supported by the supporter 20. The laser oscillator 41 may be an oscillator using any laser such as a semiconductor laser or a solid-state laser, for example. The laser oscillator 41 is preferably capable of oscillating the laser beam 45 in a wavelength range of from 400 to 1100 nm. The powdery filler metal 35 ejected from the filler-metal ejection hole 33 is molten by the laser beam 45 emitted from the laser emitter 43. In addition, the workpiece 2 is partially molten by the laser beam 45 emitted from the laser emitter 43. Then, components of the molten filler metal 35 are dissolved in the molten workpiece 2, and components of the workpiece 2 are dissolved in the molten filler metal 35. The molten filler metal 35 and the molten workpiece 2 form a molten pool 4 on the surface to be built-up 2a. Thereafter, the molten pool 4 solidifies to become the build-up layer 3.

As shown in FIG. 4, the shielding gas supply unit 50 has a shielding gas housing 51 that houses a shielding gas 55, a gas supply tube 52 that leads the shielding gas 55 derived from the shielding gas housing 51 to the vicinity of the workpiece 2 supported by the supporter 20, and a shielding gas ejection hole 53 provided at the distal end of the gas supply tube 52 to eject the shielding gas 55. The shielding gas 55 may be an inert gas such as helium, argon or nitrogen, for example.

In the illustrated example, the welding equipment 10 has a welding torch 15. The welding torch 15 has a distal end surface 15a where the aforementioned filler-metal ejection hole 33, the laser emitter 43 and the shielding gas ejection hole 33 are formed. The welding torch 15 is positioned such that its distal end surface 15a faces the surface to be built-up 2a of the workpiece 2 supported by the supporter 20. The welding torch 15 is provided to be relatively movable in the aforementioned longitudinal direction with respect to the supporter 20.

The longitudinal motion drive 60 shown in FIGS. 2 and 3 relatively moves the laser emitter 43 along the longitudinal direction with respect to the workpiece 2 supported by the supporter 20. In the illustrated example, the longitudinal motion drive 60 moves the welding torch 15 in the longitudinal direction with respect to the supporter 20. The longitudinal motion drive 60 moves the welding torch 15 in the direction D1 from one end of the workpiece 2 supported by the supporter 20 toward the other end thereof. It goes without saying that the longitudinal motion drive 60 may move the supporter 20 in the longitudinal direction with respect to the welding torch 15.

The rotational motion unit 70 rotates the workpiece 2 supported by the supporter 20 around the rotation axis 70X. In the illustrated example, the rotation axis 70X corresponds to the axis 2X of the workpiece 2 (the central axis of the cylindrical surface to be built-up 2a). The rotational motion unit 70 rotates the workpiece 2 at a predetermined rotating speed. In the example shown in FIG. 3, the rotational motion unit 70 rotates the workpiece 2 clockwise in FIG. 3, but the present invention is not limited thereto. The rotational motion unit 70 may rotate the workpiece 2 counterclockwise in FIG. 3.

Since the welding torch 15 is relatively moved by the longitudinal motion drive 60 in the longitudinal direction with respect to the workpiece 2, and the workpiece 2 is rotated by the rotational motion unit 70 around the rotation axis 70X, the welding torch 15 draws a spiral trajectory around the surface to be built-up 2a of the workpiece 2. Due to the movement of the welding torch 15 and the rotation of the workpiece 2, the molten pool 4 formed on the surface to be built-up 2a moves away from the laser bean 45, and solidifies to become the build-up layer 3.

In recent years, in order to improve the power generation efficiency of a thermal power plant, it has been desired to improve a wear resistance of a component used in the thermal power plant and to suppress formation of an oxidized scale on the component. For example, when the welded member shown in FIG. 1 is used as a valve stem of a steam valve, an opening and closing action of the steam valve with the movement of the valve stem can be more reliable by improving the wear resistance of the build-up layer. Namely, when the build-up layer is worn as the valve stem slides, the amount of steam leaking from a gap between the valve stem and the valve chest increases, which lowers the thermal efficiency of the thermal power plant. In addition, an oxidized scale formed on the valve stem increases an external diameter of the valve stem. Alternatively, the oxidized scale peels off and accumulates around the valve stem. When the external diameter of the valve stem increases and/or when the oxidized scale accumulates between the valve stem and the valve chest, the valve stem cannot move as desired. In terms of this point, JPH6-174126 discloses a method of forming a build-up layer by welding a cobalt-base alloy to a surface to be built-up of a workpiece in order to improve wear resistance of a valve stem and to suppress an generation of oxidized scale.

However, the inventors found that, when a welded member is manufactured by the method described in JPH6-174126, the hardness of the build-up layer differs along the longitudinal direction of the workpiece. Specifically, when the portion of the build-up layer at which the welding is started is referred to as weld start portion and the portion thereof at which the welding is ended is referred to as weld end portion, the hardness of the build-up layer in the vicinity of the weld end portion was found to be lower than the hardness of the build-up layer in the vicinity of the weld start portion. After having conducted extensive studies, the inventors discovered the cause of the decrease in hardness of the build-up layer in the vicinity of the weld end portion compared to the hardness in the vicinity of the weld start portion. Namely, from the start to the end of the build-up welding process, heat is applied to the workpiece by a laser beam. Thus, the temperature of each portion of the workpiece increases along a welding direction (the direction in which the welding torch travels). As a result, the dilution rate of components of the filler metal in each portion of the build-up layer increases along the welding direction (in other words, from the weld start portion toward the weld end portion). When the dilution rate becomes excessively high, the hardness of the build-up layer becomes insufficient for use in a thermal power plant where high temperature steam flows. It goes without saying that characteristics of the build-up layer other than the hardness differ between the weld start portion and the weld end portion. Specifically, compared to the characteristics of the build-up layer at the weld start portion, the characteristics of the build-up layer at the weld end portion more deviate from characteristics of the filler metal before the welding.

In consideration of these points, the welding equipment 10 and the welding method in the embodiment are devised to prevent a dilution rate of components of the filler metal from increasing from the weld start portion toward the weld end portion so as to improve the characteristics of the build-up layer 3 (make them closer to the characteristics of the filler metal 35). Namely, the welding equipment 10 comprises means for controlling, during the build-up welding process, an output of the laser beam 45 oscillated from the laser oscillator 41 so as to prevent the increase in temperature of the workpiece 2 caused by the heat input of the laser beam 45.

As a method of preventing the increase in temperature of the workpiece 2 during the build-up welding process, it can be considered that application of the laser beam to the workpiece is interrupted during the build-up welding process (i.e., the build-up welding process is interrupted) to dissipate the heat of the workpiece 2. However, when the build-up welding process is interrupted, it takes longer to complete the build-up welding process from the start to the end. Thus, the build-up welding cannot be efficiently performed. On the other hand, the method in which the build-up welding process is performed while an output of the laser beam 45 oscillated from the laser oscillator 41 is being controlled makes it possible to prevent the increase in temperature of the workpiece 2 and to prevent the resulting increase in dilution rate, without interrupting the build-up welding process.

Further, it can be considered that, when the output of the laser beam 45 oscillated from the laser oscillator 41 is controlled, the temperature of the workpiece 2 is directly measured, and the output of the laser beam 45 is controlled based on the measured temperature. However, it is necessary to measure temperatures of plural points on the workpiece in order to control the output of the laser beam 45. To control the output of the laser beam based on plural measured temperatures requires time and effort.

In this regard, under favor of the fact that a dimension of the molten pool 4 becomes larger as the temperature of the workpiece 2 increases, the increase in temperature of the workpiece 2 can be reliably and efficiently prevented by controlling the output of the laser beam 45 based on the dimension of the molten pool 4.

Specifically, the welding equipment 10 in the embodiment comprises a dimension measuring unit 80 that obtains information on the dimension of the molten pool 4, and a controller 90 that controls the laser irradiator 40 based on the information.

The dimension measuring unit 80 obtains information on the dimension of the molten pool 4 as follows. Namely, the dimension measuring unit 80 obtains temperatures of respective points in an area including the molten pool 4 on the workpiece 2 which is being subjected to the build-up welding process, and performs temperature mapping of the area including the molten pool 4 to create a temperature distribution map. Then, on the assumption that points having a predetermined temperature or more in the aforementioned area including the molten pool 4 correspond to an area including only the molten pool 4, the dimension measuring unit 80 obtains information on the dimension of this area based on the temperature distribution map so as to obtain information on the dimension of the molten pool 4.

The predetermined temperature used for determining an area including only the molten pool 4 is determined in consideration of melting points of the workpiece 2 and the filler metal 35.

In order that the molten pool 4 is measured in this manner, in the illustrated example, the dimension measuring unit 80 comprises a non-contact radiation temperature sensor 81, and a processer 82 that creates a temperature distribution map by performing temperature mapping of an area including the molten pool 4 based on temperatures obtained by the temperature sensor 81. The temperature sensor 81 detects an infrared ray radiated from an area including the molten pool 4 on the workpiece 2 to obtain temperatures of respective points in the area. The dimension measuring unit 80 may include a reflection element (e.g., a dichroic mirror) for reflecting the infrared ray toward the temperature sensor 81.

The temperature sensor 81 is relatively movable along the longitudinal direction with respect to the workpiece 2 supported by the supporter 20. The temperature sensor 81 is moved, together with the welding torch 15, by the longitudinal motion drive 60 in the longitudinal direction. Thus, a temperature of the aforementioned area including the molten pool 4 can be continuously measured from the start of the below-stated build-up step to the end thereof. In the illustrated example, the temperature sensor 81 is fixed on the welding torch 15.

The processer 82 creates information on a dimension of the molten pool 4 based on a temperature distribution map, and sends it to the controller 90. Since the temperature sensor 81 measures a temperature of the aforementioned area including the molten pool 4 from the start of the below-stated build-up step to the end thereof, the processer 82 can continuously send information on a dimension of the molten pool 4 to the controller 90 from the start of the build-up step to the end thereof.

The controller 90 controls the laser oscillator 41 based on the information on a dimension of the molten pool 4 received from the processor 82. Specifically, the controller 90 controls the laser oscillator 41 in such a manner that, the larger a dimension of the molten pool 4 is, the lower an intensity of the laser beam 45 emitted from the laser emitter 43 becomes. In other words, the controller 90 controls the laser oscillator 41 in such a manner that, the smaller a dimension of the molten pool 4 is, the higher an intensity of the laser beam 45 emitted from the laser emitter 43 becomes. Thus, a dimension of the molten pool 4 can be controlled within a predetermined range. This means that a temperature of the workpiece 2 can be controlled as desired during the build-up welding process. Further, this means that a dilution rate of components of the filler metal 35 in the build-up layer 35 can be controlled as desired. As a result, the build-up layer 3 can have desired characteristics. Since information on a dimension of the molten pool 4 is continuously sent from the processer 82 to the controller 90 from the start of the build-up step to the end thereof, the controller 90 can continuously control the laser oscillator 41 from the start of the build-up step to the end thereof. For this reason, the increase in temperature of the workpiece 2 and the resulting increase in dilution rate can be prevented without interrupting the build-up step.

In the illustrated example, an output of the laser beam 45 is controlled in such a manner that the aforementioned dilution rate is 10% or more and 40% or less, preferably 15% or more and 35% or less. This is because, when the dilution rate is less than 10%, an insufficiently fused portion may be formed between the build-up layer 3 and the workpiece 2. On the other hand, when the dilution rate exceeds 40%, a hardness of the build-up layer may become insufficient for use in a thermal power plant where high temperature steam flows. When an output of the laser beam 45 is controlled in such a manner that the aforementioned dilution rate is 15% or more and 35% or less, a Vickers hardness of the build-up layer 3 can be more reliably within the range of Hv 320 or more and Hv 500 or less.

Next, an operation of the embodiment as structured above will be described. Herein, a welding method using the aforementioned welding equipment 10 is described.

First, as shown in FIG. 2, the both ends of the workpiece 2 are supported by the supporter 20.

Following thereto, the welding torch 15 and the temperature sensor 81 are positioned in the vicinity of the aforementioned one end of the workpiece 2.

Then, the workpiece 2 is rotated by the rotational motion unit 70 around the rotation axis 70X. In addition, the movement of the welding torch 15 and the temperature sensor 81 along the longitudinal direction is started by the longitudinal motion drive 60. The welding torch 15 and the temperature sensor 81 are moved in the aforementioned movement direction D1.

Next, the build-up step for forming the build-up layer 3 on the workpiece 2 is performed. In this build-up step, the filler metal 35 is supplied from the welding torch 15 to the surface to be built-up 2a of the workpiece 2, and the laser beam 45 is applied thereto. The build-up step of forming the build-up layer is performed in such a manner that the workpiece 2 is being rotated by the rotational motion unit 70 while the welding torch 15 and the temperature sensor 81 are being moved by the longitudinal motion drive 60.

In the illustrated example, the laser beam 45 is emitted from the laser emitter 43 of the welding torch 15. For this while, the powdery filler metal 35 is supplied from the filler-metal ejection hole 33 of the welding torch 15. The filler metal 35 is supplied from around the laser beam 45 along the laser beam 45. Thus, the powdery filler metal 35 is molten by the laser beam 45. In addition, the workpiece 2 is partially molten by the laser beam 45. The molten filler metal 35 and the molten portion of the workpiece 2 form a molten pool 4 on the surface to be built-up 2a of the workpiece 2. Then, components of the molten filler metal 35 are dissolved in the molten portion of the workpiece 2, and components of the molten portion of the workpiece 2 are dissolved in the molten filler metal 35. The powdery filler metal 35 ejected from the filler-metal ejection hole 33 and the molten pool 4 formed by the molten filler metal 35 and the molten portion of the workpiece 2 are surrounded by the shielding gas 55 supplied from the shielding gas ejection hole 53 and thus are prevented from being oxidized by the atmosphere.

During the build-up step, the welding torch 15 is moved with respect to the workpiece 2, so that the molten pool 4 formed on the surface to be built-up 2a of the workpiece 2 becomes away from the laser beam 45 and solidifies to become the build-up layer 3. In addition, during the build-up step, the welding torch 15 draws a spiral trajectory around the surface to be built-up 2a of the workpiece 2, so that the molten pool 4 and the build-up layer 3 are formed on the surface to be built-up 2a along the above spiral trajectory.

During the build-up step, the temperature sensor 81 measures a temperature of an area including the molten pool 4 on the workpiece 2. The position of the molten pool 4 on the workpiece 2 moves along the spiral trajectory, and the position of the temperature sensor 81 on the workpiece 2 also moves following to the molten pool 4. The processor 82 creates a temperature distribution map based on temperatures measured by the temperature sensor 81. Then, the processor 82 creates information on a dimension of the molten pool 4 based on the temperature distribution map. The controller 90 controls the laser oscillator 41 based on the information on a dimension of the molten pool 4 created by the processor 82.

After the build-up step, a surface treatment step for machining the surface of the build-up layer 3 to smooth the surface (into a cylindrical surface) may be performed.

Next, the present invention will be described more specifically by means of an example, but the present invention is not limited to the following example, as long as they are within the scope of the invention.

Example

The workpiece 2 was subjected to build-up welding using the aforementioned welding equipment 10, whereby one build-up layer 3 was formed on the surface to be built-up 2a of the workpiece 2, as shown in FIG. 1. A cylindrical forged bar of nickel-base alloy was used as the workpiece 2, and powder of cobalt-base alloy was used as the filler metal 35. An oscillator using a solid laser was used as the laser oscillator 41. Then, the build-up step was performed under the following welding conditions.

<Welding Conditions>

Feed rate of filler metal: 10 g/min to 60 g/min

Welding speed: 200 mm/min to 1000 mm/min

Laser output: 2 kW to 10 kW

The term "welding speed" means here the speed of the welding torch 15 with respect to the surface to be built-up 2a of the workpiece 2 (the speed of the welding torch 15 along the spiral trajectory described above).

The surface treatment step was performed by machining the build-up layer 3 formed on the workpiece 2 under the aforementioned conditions so that the build-up layer 3 had a thickness of 0.5 mm. The thickness of the build-up layer 3 was measured here with reference to the original position of the surface to be built-up 2a of the workpiece 2 before performing build-up welding. In other words, the thickness of the build-up layer 2 is a difference T between a radius 3R of the outer peripheral surface 3a of the build-up layer 3 formed on the workpiece 2 and the radius 2R of the outer peripheral surface (surface to be built-up 2a) of the workpiece 2 before the workpiece 2 is subjected to build-up welding.

After the surface treatment step had been performed, a sectional sample of the obtained welded member 1 was made, and the hardness of the build-up layer 3 and the dilution rate of the filler metal 35 in the build-up layer 3 were measured. The hardness is measured by using the Vickers hardness test.

Comparative Example

The build-up step and the surface treatment step were performed similarly to Example, except that the output control of the laser beam 45 was not performed during the build-up welding process. Then, the hardness of the build-up layer 3 and the dilution rate of components of the filler metal 35 in the build-up layer 3 were measured.
(Evaluation)
Table 1 shows the hardnesses and the dilution rates of each build-up layers 3 in Example and Comparative Example.

TABLE 1

| | Output control | Core Max. TEMP (° C.) | Hardness (Hv) | | Dilution (%) | |
| --- | --- | --- | --- | --- | --- | --- |
| | | | Start portion | End portion | Start portion | End portion |
| Example | Yes | 303 | 492 | 353 | 10.0 | 21.8 |
| Comp. Example | No | 369 | 418 | 319 | 18.0 | 41.3 |

As shown in Table 1, the dilution rates of components of the filler metal 35 in the build-up layer 3 of Comparative Example were 18.0% at the weld start portion and 41.3% at the weld end portion. Namely, in Comparative Example, the aforementioned dilution rate was higher at the weld end portion than at the weld start portion. The dilution rate of the build-up layer 3 of Comparative Example exceeded 40% at the weld end portion. In addition, the hardnesses of the build-up layer 3 of Comparative Example were Hv 418 at the weld start portion and Hv 319 at the weld end portion. Namely, in Comparative Example, the hardness of the build-up layer 3 was lower at the weld end portion than at the weld start portion. The hardness of the build-up layer 3 of Comparative Example was less than Hv 320 at the weld end portion.

On the other hand, the dilution rates of components of the filler metal 35 in the build-up layer 3 of Example were 10.0% at the weld start portion and 21.8% at the weld end portion. Namely, in Example, the aforementioned dilution rate was higher at the weld end portion than at the weld start portion. The dilution rate of the build-up layer 3 of Example was 10% or more and 40% or less both at the weld start portion and the weld end portion. In addition, the hardnesses of the build-up layer 3 of Example were Hv 492 at the weld start portion and Hv 353 at the weld end portion. Namely, in Example, the hardness of the build-up layer 3 was lower at the weld end portion than at the weld start portion. The hardness of the build-up layer 3 of Example was Hv 320 or more both at the weld start portion and the weld end portion.

From the above results, it can be understood that the characteristics of the build-up layer 3 can be controlled by controlling the output of the laser beam 45 based on information on the dimension of the molten pool 4.

In the aforementioned embodiment and Example, the build-up layer 3 is formed in the build-up step by supplying the filler metal 35 to the surface to be built-up 2a along the longitudinal direction, and by applying the laser beam 45 thereto. However, the present invention is not limited thereto. The build-up layer 3 may be formed by applying the laser beam 45 to a filler metal layer formed by thermally spraying or applying the filler metal 35 to the surface to be built-up 2a. In this case, the welding equipment 10 may comprise, instead of the filler-metal supply unit 30, a filler-metal-layer forming unit that forms a filler metal layer by thermally spraying or applying the filler metal 35 to the surface to be built-up 2a. The supporter 20 may support the workpiece 2 with the filler metal layer formed thereon, and the laser irradiator 40 may apply a laser beam to the workpiece 2 with the filler metal layer formed thereon. In addition, in this case, the welding method may comprise a filler-metal-layer forming step of forming a filler metal layer by thermally spraying or applying the filler metal 35 to the surface to be built-up 2a. In the build-up step, the laser beam 45 may be applied to the filler metal layer after the filler-metal-forming step to melt again the filler metal 35 of the filler metal layer so as to form the build-up layer 3 on the surface to be built-up 2a.

As described above, the welding method according to the embodiment is a welding method for subjecting a surface to be built-up 2a of an elongated workpiece 2 to a build-up welding process along a longitudinal direction of the workpiece 2, the welding method comprising a step of forming a build-up layer 3 on the surface to be built-up 2a by supplying a filler metal 35 to the surface to be built-up 2a along the longitudinal direction and by applying a laser beam 45 thereto to melt the filler metal 35. In the step of forming the build-up layer, information on a dimension of a molten pool formed by the filler metal and the workpiece molten by the laser beam is obtained, and an output of the laser beam is controlled based on the information. Such a welding method can control the temperature of the workpiece 2 and the dilution rate of components of the filler metal 35 in the build-up layer 3 during the build-up welding process as desired. As a result, the build-up layer 3 can have desired characteristics.

Alternatively, the welding method according to the embodiment is a welding method for subjecting a surface to be built-up 2a of an elongated workpiece 2 to a build-up welding process along a longitudinal direction of the workpiece 2, which welding method may comprise: a step of forming a filler metal layer by thermally spraying or applying a filler metal 35 to the surface to be built-up 2a; and after the filler-metal-layer forming, a step of forming a build-up layer 3 on the surface to be built-up 2a by applying a laser beam 45 to the filler metal layer along the longitudinal direction to again melt the filler metal 35 of the filler metal layer. In the step of forming the build-up layer, information on a dimension of a molten pool 4 formed by the filler metal 35 and the workpiece 2 molten by the laser beam 45 may be obtained, and an output of the laser beam 45 may be controlled based on the information. Such a welding method can also control the temperature of the workpiece 2 and the dilution rate of components of the filler metal 35 in the build-up layer 3 during the build-up welding process as desired. As a result, the build-up layer 3 can have desired characteristics.

In the welding method according to the embodiment, the information on a dimension of the molten pool 4 is obtained using a non-contact radiation temperature sensor 81.

The welded member 1 according to the embodiment is a welded member 1 with a build-up layer 3 of a filler metal 35 welded to a surface to be built-up 2a of an elongated workpiece 2, wherein a dilution rate of components of the filler metal 35 in the build-up layer 3 is 10% or more and 40% or less, preferably, 15% or more and 35% or less. Such a welded member 1 can prevent the possibility that an insufficiently fused portion is formed between the build-up layer 3 and the workpiece 2, and can make it possible that the build-up layer 3 has a hardness suitable for use in a thermal power plant where high temperature steam flows.

The welded member 1 according to the embodiment is a welded member 1 with a build-up layer 3 of a cobalt-base alloy 35 welded to a surface to be built-up 2a of an elongated object 2, wherein a Vickers hardness of the build-up layer 3 is Hv 320 or more and Hv 500 or less. Such a welded member 1 can make it possible that the build-up layer 3 has a hardness suitable for use in a thermal power plant where high temperature steam flows.

The embodiment can provide a weld method for subjecting a workpiece to a build-up welding process, which is capable of improving characteristics such as a hardness of a build-up layer, and a welded member wherein characteristics of a build-up layer are improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the invention. In addition, it goes without saying that these embodiments and modifications can be partially combined as appropriate, within the range of the scope of the present invention.

What is claimed is:

1. A welding method for subjecting a surface to be built-up of an elongated workpiece to a build-up welding process along a longitudinal direction of the workpiece, the welding method comprising:
    forming a build-up layer on the surface to be built-up by supplying a filler metal to the surface to be built-up along the longitudinal direction and by applying a laser beam thereto to melt the filler metal,
    wherein, in the forming the build-up layer, by a non-contact radiation temperature sensor, temperature of a plurality of points in an area including a molten pool formed by dissolving components of the molten workpiece in the filler metal molten by the laser beam is obtained and temperature mapping of the area including the molten pool is performed to create a temperature distribution map,
    on the assumption that the area having a temperature of melting points of the workpiece and the filler metal or more in the area including the molten pool corresponds to an area including only the molten pool, information on a dimension of this area is obtained based on the temperature distribution map as information on the dimension of the molten pool, and
    in order that the dimension of the molten pool is within a predetermined range and that a dilution rate of components of the filler metal in the build-up layer is 10% or more and 40% or less, an output of the laser beam is controlled in such a manner that the larger the dimension of the molten pool is, the lower an intensity of the laser beam becomes, and the smaller the dimension of the molten pool is, the higher the intensity of the laser beam becomes.

2. The welding method according to claim 1, wherein
    in the forming a build-up layer, the filler metal is supplied to the surface to be built-up while the laser beam is applied thereto.

3. The welding method according to claim 1, wherein
    the information on a dimension of the molten pool is obtained using the non-contact radiation temperature sensor.

4. The welding method according to claim 1, wherein
    in the forming the build-up layer, the filler metal is supplied by thermally spraying or applying the filler metal to the surface to be built-up to form a filler metal layer; and
    after forming the filler metal layer, the laser beam is applied to the filler metal layer along the longitudinal direction to again melt the filler metal of the filler metal layer.

5. The welding method according to claim 4, wherein
    the information on a dimension of the molten pool is obtained using the non-contact radiation temperature sensor.

6. A welded member with a build-up layer of a filler metal welded to a surface to be built-up of an elongated workpiece by a welding method, the welding method subjecting the surface to be built-up of the elongated workpiece to a build-up welding process along a longitudinal direction of the workpiece, the welding method comprising:
    forming a build-up layer on the surface to be built-up by supplying a filler metal to the surface to be built-up along a longitudinal direction and by applying a laser beam thereto to melt the filler metal, wherein
    in the forming the build-up layer, by a non-contact radiation temperature sensor, temperature of a plurality of points in an area including a molten pool on the workpiece which is being subjected to the build-up welding process, the molten pool being formed by dissolving components of the molten workpiece in the filler metal molten by the laser beam is obtained and temperature mapping of the area including the molten pool is performed to create a temperature distribution map,
    on the assumption that the area having a temperature of melting points of the workpiece and the filler metal or more in the area including the molten pool corresponds to an area including only the molten pool, information on a dimension of this area is obtained based on the temperature distribution map so as to obtain as information on the dimension of the molten pool,
    in order that the dimension of the molten pool is within a predetermined range, an output of the laser beam is controlled in such a manner that the larger the dimension of the molten pool is, the lower an intensity of the laser beam becomes, and the smaller the dimension of the molten pool is, the higher the intensity of the laser beam becomes, and
    a dilution rate of components of the filler metal in the build-up layer is 10% or more and 40% or less.

7. The welded member according to claim 6, wherein the dilution rate is 15% or more and 35% or less.

8. A welded member with a build-up layer of a cobalt-base alloy welded to a surface to be built-up of an elongated workpiece by a welding method, the welding method subjecting the surface to be built-up of the elongated workpiece to a build-up welding process along a longitudinal direction of the workpiece, the welding method comprising:

forming a build-up layer on the surface to be built-up by supplying a filler metal to the surface to be built-up along a longitudinal direction and by applying a laser beam thereto to melt the filler metal, wherein in the forming the build-up layer, by a non-contact radiation temperature sensor, temperature of a plurality of points in an area including a molten pool on the workpiece which is being subjected to the build-up welding process, the molten pool being formed by dissolving components of the molten workpiece in the filler metal molten by the laser beam is obtained and temperature mapping of the area including the molten pool is performed to create a temperature distribution map, on the assumption that the area having a temperature of melting points of the workpiece and the filler metal or more in the area including the molten pool corresponds to an area including only the molten pool, information on a dimension of this area is obtained based on the temperature distribution map as information on the dimension of the molten pool, in order that the dimension of the molten pool is within a predetermined range, an output of the laser beam is controlled in such a manner that the larger the dimension of the molten pool is, the lower an intensity of the laser beam becomes, and the smaller the dimension of the molten pool is, the higher the intensity of the laser beam becomes, and a Vickers hardness of the build-up layer is Hv 320 or more and Hv 500 or less.

* * * * *